Patented Sept. 26, 1939

2,174,132

UNITED STATES PATENT OFFICE 2,174,132

PRODUCING RESISTANT VARNISH COATINGS ON WOOD

Wilhelm Otto Maisch, Stuttgart, Germany, assignor to the firm Hermann Frenkel, Molkau, near Leipzig, Germany No Drawing. Application November 17, 1937, Serial No. 175,174

3 Claims. (Cl. 91—68)

This invention relates to improvements in a process for producing resistant varnish coatings on wood. More particularly this invention concerns modifications of the process described and claimed in my United States Patent No. 2,114,784.

According to the said patent the wood is coated with a phenol-formaldehyde artificial resin which is hardenable at low or normal temperatures and then the resin on the wood is hardened at a temperature from normal to near but below 80° C. According to a special mode of carrying out the process according to the said patent phenol-formaldehyde artificial resin varnishes are used which are neutralized or slightly acidified by addition of an acid and which dry and harden in the air at ordinary temperatures or in certain cases after preliminary hardening are afterhardened in the air at temperatures of 40-80° C. These varnish coatings can be improved according to the said patent by treating the wood, before applying the phenol-formaldehyde artificial resin varnish, with a pore filler containing phenol-formaldehyde resin which is also hardenable at low or normal temperatures. The pore filler may also contain fillers and solvents.

I have also already disclosed in the said patent that solutions of resins, e. g., colophony, shellac, or artificial resins, e. g., vinyl resins, may be added to the phenol-formaldehyde resin varnishes, in order to obtain a better result.

I have now further found that a particularly satisfactory result can be obtained by coating the wood with a varnish consisting of a solution of an organic solvent and a mixture of a hardenable phenol-formaldehyde resin obtained by alkali condensing one mol of a phenol with at least 1.5 mols of formaldehyde together with an artificial resin from the urea-aldehyde resin group and hardening the resin mixture at a temperature from normal to near but below 80° C. One secures by the addition of the urea-aldehyde resin a more rapid drying of the applied film, superior brightness and light stability, more particularly with respect to higher temperatures of 50-80° C., and also a higher elasticity and a better stability and resistance against weather and water. These advantages are surprising; the last-named technical advance in particular was in no way to be foreseen. As is well known the urea-aldehyde resins are very sensitive to water, swell in a glue-like manner under the prolonged action of moisture and can in no case be regarded as resistant to the weather. This is due to the fact that these resins become hardened only at about 150° C. and only then are they insoluble in water. All the more surprising therefore is the property of this resin group of yielding in combination with phenol-formaldehyde resin coatings which are particularly resistant towards water and weather.

A further notable advantage which is secured by mixing a hardenable phenol-formaldehyde resin with an urea-aldehyde resin is that the films can be applied in thicker layers without becoming turbid or opaque.

The hardening of these resin mixtures takes place with the addition of an acid hardening agent, such as inorganic or organic acids, at ordinary temperatures or at temperatures up to about 80° C. Without the addition of an acid hardening agent the hardening of the resin mixtures takes place only at a temperature of about 80° C.

The urea-aldehyde resins which are used are the products obtained by condensing formaldehyde with urea or its derivatives, such as monomethylol-urea or dimethylol-urea, or mixtures of urea and its derivatives.

The addition of urea-aldehyde resins may amount up to from 5 to 100%, calculated on the phenol-formaldehyde resin. Preferably the urea-formaldehyde resins are dissolved in alcohols, more particularly higher boiling aliphatic alcohols having at least three carbon atoms, or aliphatic esters or ketones.

*Example.*—Ten kg. of phenol are condensed with 20 kg. of formaldehyde (30% by weight) with an addition of 500 grams of sodium bicarbonate. The resin is evaporated down in vacuum to the point of thick liquidity and thereupon dissolved in alcohols, esters or ketones. To this solution is added an urea-formaldehyde resin which has been dissolved in butyl alcohol or ethyl alcohol. The urea-formaldehyde resin is added in quantities of 20% calculated on the phenol-aldehyde resin. The varnish obtained in this way, is applied to wood and dried and hardened at temperatures up to about 80° C. A coating is obtained which is extremely waterproof and stable towards light.

In place of phenol an equivalent quantity of cresol may be used. In place of sodium bicarbonate an equivalent quantity of some other inorganic or organic base, for instance sodium hydroxide, potassium hydroxide, dimethylamine, may be used.

What I claim is:

1. A process for producing resistant varnish coatings on wood consisting in coating the wood with a varnish consisting of a solution in an organic solvent of a mixture of a hardenable phenol-formaldehyde resin obtained by alkali condensing one mol of phenol with at least 1.5 mols of formaldehyde together with an artificial resin from the urea-aldehyde resin group amounting to from 5% to 100% calculated on the phenol-formaldehyde resin and with an acid hardening agent, and hardening the resin mixture in the air at normal temperature.

2. A process for producing resistant varnish coatings on wood consisting in coating the wood with a varnish consisting of a mixture of a solution in an organic solvent of a mixture of a hardenable phenol-formaldehyde resin obtained by alkali condensing one mol of phenol with at least 1.5 mols of formaldehyde together with a solution in an aliphatic alcohol having at least three carbon atoms of an artificial resin from the urea-aldehyde resin group amounting to from 5% to 100% calculated on the phenol-formaldehyde resin and with an acid hardening agent, and hardening the resin mixture in the air at normal temperature.

3. A process for producing resistant varnish coatings on wood consisting in coating the wood with a varnish consisting of a solution in an organic solvent of a mixture of a hardenable phenol-formaldehyde resin obtained by alkali condensing one mol of phenol with at least 1.5 mols of formaldehyde together with an artificial resin from the urea-aldehyde resin group in an amount from 5 to 100%, calculated on the phenol-formaldehyde resin, and with an acid hardening agent, and hardening the resin mixture in the air at normal temperature.

WILHELM OTTO MAISCH.